United States Patent

[11] 3,613,950

[72] Inventor Charles R. Sauber
 Raleigh, N.C.
[21] Appl. No. 852,848
[22] Filed Aug. 25, 1969
[45] Patented Oct. 19, 1971
[73] Assignee Aerotron, Inc.
 Raleigh, N.C.

[54] SYSTEM FOR REMOTELY CONTROLLING AND MONITORING FUEL-DISPENSING PUMPS
 9 Claims, 3 Drawing Figs.
[52] U.S. Cl...................................................... 222/16,
 222/76
[51] Int. Cl....................................................... B67d 5/30
[50] Field of Search........................................... 222/16, 39,
 76, 70; 179/2 A; 340/147

[56] References Cited
 UNITED STATES PATENTS
3,390,234 6/1968 Glidden........................ 179/2 A
3,402,851 9/1968 Ciotti et al.................... 222/16

Primary Examiner—Robert B. Reeves
Assistant Examiner—John P. Shannon, Jr.
Attorneys—A. Yates Dowell and A. Yates Dowell, Jr.

ABSTRACT: A system is provided for controlling and monitoring a plurality of remote fuel-dispensing pumps from a central location. An intercom circuit between the dispenser pumps and a control console will inform the console operator when to start operation of the system. When started, a transaction counter indicative of the dispenser pump selected by a pump selector switch will reset to zero and begin registering until a controlled preset time after pulses from a telemeter within the dispenser pump are no longer received. At this time, the system will turn off until again manually reactivated by the console operator. The central station communicates with the remote fueling stations by way of a single pair of wires impedance matched to the system.

SYSTEM FOR REMOTELY CONTROLLING AND MONITORING FUEL-DISPENSING PUMPS

BACKGROUND OF THE INVENTION

This invention relates to a system for the remote controlling and monitoring of dispensing pumps and, more particularly, to a system which is capable of individually controlling and monitoring a plurality of fuel-dispensing pumps from a control location over both short and long distances with a communication link that requires only a single pair of wires.

Many businesses, such for example, as home delivery launderers, movers, ice cream trucks, and the like, operate with a fleet of motor vehicles. In such businesses, it is both economical and convenient to either be associated with or own an establishment that employs a plurality of self-operated fueling stations at a number of convenient locations whereby a vehicle driver can drive into a station and refuel himself. The high cost of providing fueling service attendants is thereby immediately eliminated. In such establishments, a central remote office station having a single operator is provided to allow the operator to communicate with the vehicle driver such that accurate records of the amount of fuel dispensed can be kept and the same appropriately billed at a later time.

In the past, remote-controlled fuel-dispensing stations have existed in which the vehicle operator over an intercom system would advise the remote operator of the amount of fuel dispensed so that the same could be recorded at the central location. Such prior art fuel-dispensing stations had no means for protecting against theft and pilferage by maintaining the pumps in an initially locked condition under the control of the remote operator and by enabling accurate monitoring of the fuel dispensed.

Recently, Parker in U.S. Pat. No. 3,236,415, has disclosed a monitoring system for fuel-dispensing apparatus which allows for releasing and monitoring of the fuel pumps by the remote station operator. The Parker U.S. Pat. No. 3,236,415, while somewhat satisfactory, is of limited use in that it can operate for distances only up to several hundred feet. Moreover, while the Parker patent can individually communicate remotely with a plurality of fueling pumps, each pump requires a connection of five separate wires to the remote control station, as well as an additional three separate wires for the intercom system between the central control office and the remote stations.

SUMMARY OF THE INVENTION

Accordingly, one object of this invention is to provide a new and improved unique system for the remote control and monitoring of fuel-dispensing pumps.

Another object of the subject invention is the provision of a new and improved system for the remote control and monitoring of fuel-dispensing pumps from a central location which is capable of operating over both short and long distances through the use of a single pair of wires between the control and remote stations.

Still another object of this invention is to provide a unique system for the individual remote controlling and monitoring of any one of a plurality of different dispensing pumps at the same remote fueling station.

A still further object of the present invention is to provide a new and improved system for remotely controlling and monitoring fuel dispensing pumps which can be turned on only from the control station and once turned off cannot be started again except by switching at the control station.

One further object of this invention is the provision of a unique system for the remote control and monitoring of fuel-dispensing pumps which can accurately and continuously record and print individual and cumulative fueling transactions.

Briefly, in accordance with one aspect of the present invention, these and other objects are attained by the provision of a control station which communicates over a single pair of wires with remote fuel-dispensing station pumps to operate the same in response to a request by a vehicle operator. Separate counters at the control station are used to monitor both the amount of fuel dispensed in a single transaction and the cumulative fuel dispensed over a long period of time.

BRIEF DESCRIPTION OF THE DRAWINGS

A more complete appreciation of the invention and many of the attendant advantages thereof will be readily apparent as the same becomes better understood by reference to the following detailed description when considered in connection with the accompanying drawings, wherein.

DETAILED DESCRIPTION OF THE PREFERRED EMBODIMENTS

Figure 1:
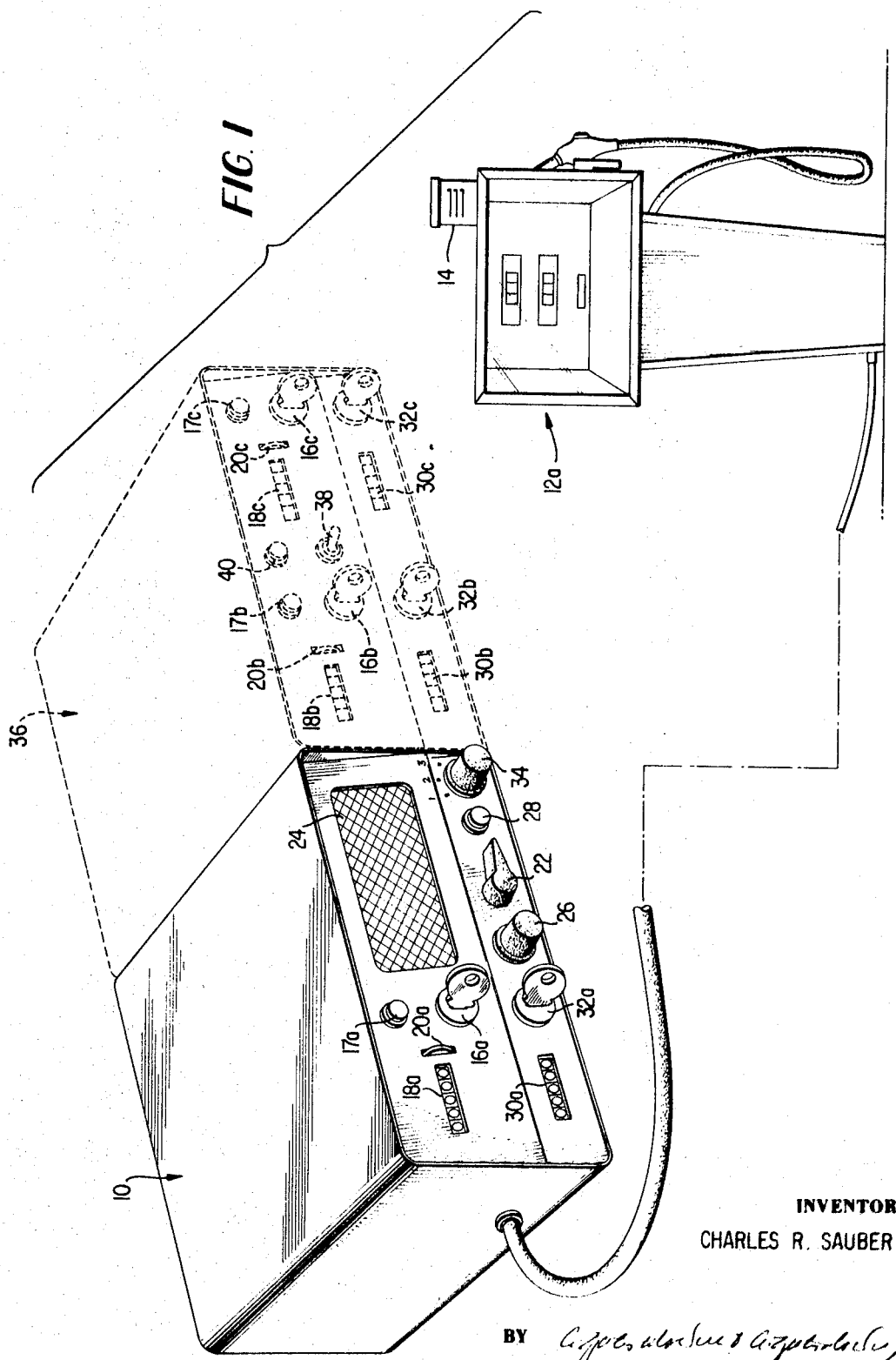
FIG. 1 is a perspective view of the system for remotely controlling and monitoring fuel-dispensing pumps in accordance with the present invention.

Referring now to the drawings, wherein like reference numerals designate identical, or corresponding parts throughout the several views and more particularly to FIG. 1 thereof, wherein a perspective view of the system for remotely controlling and monitoring fuel-dispensing pumps in accordance with the present invention is shown as including a centrally located control console unit 10 and a remote fuel-dispensing pump 12a. In operation, a vehicle driver upon arriving at a convenient remote fueling station will depress a push-to-call button on an intercom 14, which is shown as being mounted atop the fuel-dispensing pump 12a, and request to the central control operator that the pump be released for use. At the central office, the control operator need merely turn a pump on key 16a to provide the necessary power to the fuel-dispensing pump 12a so that the same may be operated. While the fuel dispensing pump 12a is operative, a visual annunciator 17a will give a visible indication of the same. As the vehicle driver fuels his vehicle, a counter 18a which has initially been reset to zero by a conventional reset switch 20a will give an accurate record of the total amount of gallons of fuel dispensed. After fuel delivery has been completed, the amount of fuel dispensed may be recorded in a record book, or optionally printed by a ticket printer or the like and the power to the system is then turned off by the console operator. At the remote control console unit 10, an intercom switch 22 and a speaker 24 are provided for allowing the console operator to communicate with the vehicle driver independently of the remainder of the system. An off-volume potentiometer switch 26 is provided to both provide power to the console 10 and to allow the level of sound appearing at the intercom speaker 24 to be adjusted. A visual indicator 28 is provided to indicate that power is being supplied to the console 10 when in an "on" condition. An accumulative counter 30a is provided for enabling a running total of the amount of gallons of fuel dispensed from the fuel pump 12a over a long period of time to be kept. This accumulative count may be reset at any time by use of a keyed reset switch 32a. Additionally, a station switch 34 is provided which allows the system to individually control and monitor a plurality of fuel pumps at a particular fueling station.

Optionally, a plug-in supplementary counter unit 36 may be used to allow the plurality of fuel-dispensing pumps at each of a multiple of separate fueling stations to be individually operated and separately recorded. It should be understood that each of the supplemental counters operates in a similar fashion to that explained above with reference to the console 10. Additionally, the plug-in supplemental counter console 36 is operated by its own power switch 38 and visual indicator 40.

Figure 2:
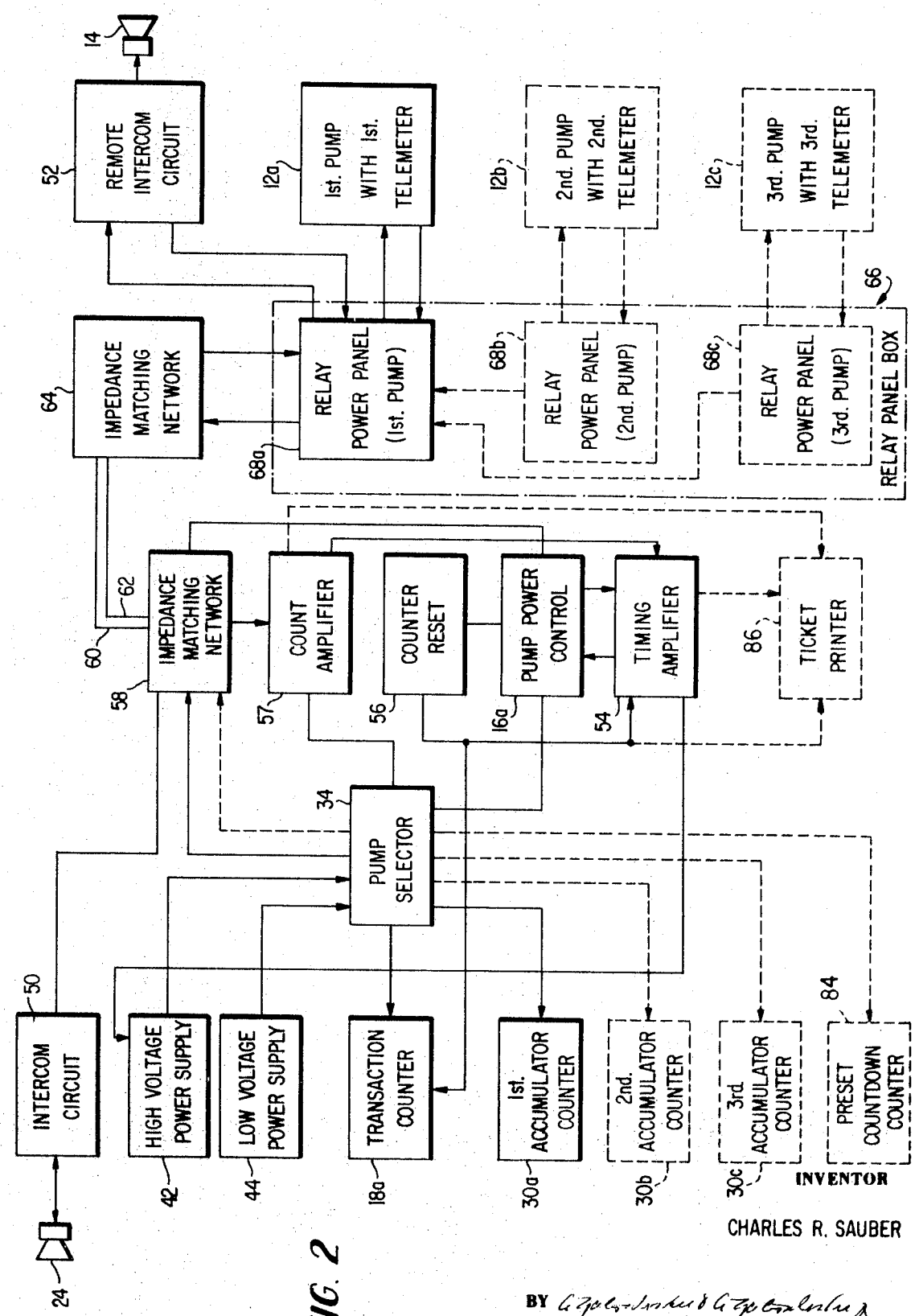
FIG. 2 is a detailed, functional block diagrammatic view of the system of remotely controlling and monitoring fuel-dispensing pumps in accordance with the present invention.

Referring now to FIG. 2, a detailed functional block diagrammatic view of the system for remotely controlling and monitoring of fuel dispensing pumps according to the present invention is therein shown. More particularly, the system contains two power supplies, namely, a high-voltage power supply 42, such as of the 125 volt, DC, zener diode regulated type, and a low-voltage power supply 44, such as of the 35 volt, DC, unregulated type. It should be understood that the low-voltage power supply 44 will continuously supply power to the intercom circuits 50 and 52, both at the central and remote stations, independently of the remainder of the system such that communication over speaker 24 at the central station and speaker 14 at the remote location may be continuously made. Both the outputs from the high-voltage power supply 42 and the low-voltage power supply 44 will be applied to the remainder of the system when the pump power control 16a is switched to the "on" position.

Figure 3:
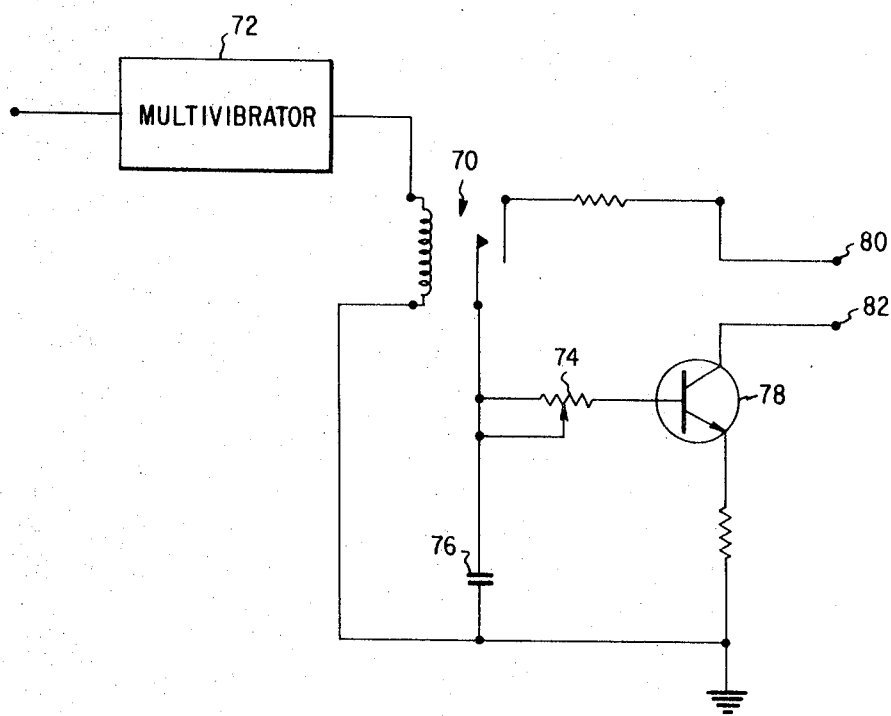
FIG. 3 is a schematic diagram of the timing amplifier in accordance with the present invention.

Let us now assume that the pump selector switch 34 which may, for example, be a conventional 5-pole, 3-position switch, is initially in the number one position, as shown in FIG. 1, and that the control station operator has started the system upon the request of the vehicle driver at speaker 14, by turning the pump power control 16a to the "on" position. With the pump power control 16a in the "on" position, the low-voltage power supply 44 will thereby be routed to all of the counting circuits and to a timing amplifier 54. A counter reset circuit 56 which is a conventional time delay triggering network, will immediately provide the timing amplifier 54 and transaction counter 18a with a single pulse, such for example, as a pulse of 30 volts for a duration of 50 milliseconds. The transaction counter 18a is of the conventional digital electromechanical type, and reads directly in gallons. The pulse emitted from the counter reset 56 will initially reset the transaction counter 18a to zero and the timing amplifier 54 will actuate thereby connecting the high-voltage power supply 42 to the pump selector switch 34, then to a conventional impedance matching network 58 with a positive polarity and then over a single pair of wires 60 and 62 through another impedance matching network 64 whereby proper voltages are supplied to a relay panel box 66. Within the relay panel box 66, a first pump relay power panel 68a which includes a sensitive relay therein, will be actuated through a blocking diode. The sensitive relay will, in turn, actuate a telemeter circuit within the first pump 12a and thereby turn the pump motor on. The timing amplifier 54 will maintain the first pump in an "on" condition for a given amount of time, for example, from 5 through 20 seconds, and in the event that pulses from the telemeter are no longer received by the counting circuits within this period of time, the timing amplifier 54 will deactuate, thereby deactivating all circuits and thus removing the power from the pump motor relay and the pump motor will cease operation. This is more clearly seen in FIG. 3 wherein the timing amplifier 54 of FIG. 2 is shown as including a conventional reed relay 70 which actuates one time for each timing cycle of the counter reset 56 in accordance with the triggering of a conventional multivibrator 72. When the reed relay 70 actuates, it charges an RC network which includes a variable resistor 74 and a capacitor 76. After a predetermined amount of time set by the variable resistor 74, a transistor 78 will conduct so as to close the relay power panel 68a of FIG. 2 through output terminals 80 and 82 and thereby turn the pump 12a on. When no more pulses are received by the timing amplifier 54, the RC network will discharge and open the relay power panel 68a whereby the pump 12a will be turned off. Once a pump is turned off, it cannot be reactivated again until the pump power control 16a is turned off and then turned on again, thereby again commencing the chain of events as enumerated above.

It should further be understood that if, at any time during the discharge time of the RC network within the timing amplifier 54, that the telemeter commences initiating pulses, then the system will remain in an activated condition. The telemeter will initiate negative pulses with respect to the impressed voltages which are routed through the relay power panel 66 to the impedance matching network 64 via the pair of wires 60 and 62 to the impedance matching network 58 and then to a count amplifier 57. The count amplifier 57 is a conventional solid-state switching circuit that will switch power to the transaction counter 18a and timing amplifier 54 each time a pulse is received.

It should now be apparent that the communication link between the central station and any remote fueling station is a single pair of wires 60 and 62. For short distances of up to a half a mile, the single pair of wires 60 and 62 between the control console and the relay box 66 may be for example, number 24 AWG wire. The only criteria with respect to the installation of the interconnecting single pair of wires 60 and 62 is whether any buildings are in the way or streets must be crossed. In this event, it would be preferable to lease a standard pair of metering lines from the local telephone company. These metering lines are normally in the telephone company cables and are available for lease at a very moderate rate. Distances over 100 miles can be realized in this manner, and therefore eliminate the necessity of installing long distance overhead or underground wires. Shielding of the pair of wires 60 and 62 is desirable, however, it is not normally necessary.

With the system of the subject invention, an optional preset countdown counter 84 may be used to initially set the system for dispensing a particular number of gallons of fluid or fuel, the completion of which will turn the system off.

Also, a conventional ticket printer 86 may be used with the present invention to allow the transaction counter and accumulative counter readings to be automatically and permanently recorded without the need of hand reproducing by the central console operator.

Likewise, as explained above with reference to FIG. 1, the system may operate a plurality of different pumps, such for example, as pumps 12a, 12b and 12c, at the same fueling station by the proper positioning of the pump selector switch 34. Each pump will have its own transaction and accumulating counters, such for example, as accumulating counters 30a, 30b and 30c.

It should now be apparent that the system of the herein-described invention provides for the controlling and monitoring of remote fuel-dispensing pumps from a central location over a single pair of wires and through the use of telephone lines can operate up to extremely large distances. It should also be apparent that the invention as described above with the exception of the electromechanical counters, key switch and selector switches may be entirely of solid-state and compact circuitry.

Obviously, numerous modifications and variations of the present invention are possible in light of the above teachings. For example, while the system has been described with capabilities of accommodating up to three fuel-dispensing pumps at a given remote location, it should be obvious that the system could readily be designed to accommodate any number of fuel-dispensing pumps. Moreover, while the system has been described as being particularly well suited for use in businesses which use a fleet of motor vehicles, the system if desired, could be used with single private vehicles. It is therefore to be understood that within the scope of the appended claims, the invention may be practiced otherwise than as specifically described herein.

What is claimed as new and desired to be secured by Letters Patent of the United States is:

1. A system for remotely controlling and monitoring the dispensing of fluid comprising a control station and a remote dispensing station connected by a single pair of electrical conductors, low-voltage power means located at said control station, communication means at said control station and said remote station, said communication means being operated by said low-voltage power means and permitting constant communication between said control station and said dispensing station over said conductors, at least one pump means having a telemeter located at said dispensing station, high-voltage power means at said control station for supplying power over said conductors to said pump means in response to a signal from an operator at said remote station so that the operator can dispense fluid from said pump means, means at said control station for counting the amount of fluid dispensed at said remote station in response to signals from said telemeter, and means at said control station for deactivating said high-voltage power means and said pump means a predetermined period of time after the fluid has been dispensed and the signals from said telemeter are interrupted.

2. The structure of claim 1 in which said means for deactivating said high-voltage power means includes a count amplifier for receiving pulses from said telemeter and for generating pulses therefrom as long as pulses from said telemeter are received, a timing amplifier for receiving pulses generated by said count amplifier, and a relay in said high-voltage power means adapted to be opened by said timing amplifier a predetermined period of time after the signals from the telemeter are interrupted.

3. The structure of claim 1 in which said means for counting the fluid dispensed includes a first digital counter for counting the total amount of fluid dispensed in an individual transaction from said pump means, and a second digital counter for counting an accumulative amount of fluid dispensed from said pump means over a long period of time.

4. The structure of claim 3 including a counter reset for initially setting said first digital counter to a zero position.

5. The structure of claim 1 in which said communication means includes an intercom circuit with a speaker at each of said control station and remote dispensing station.

6. The structure of claim 1 in which said single pair of electrical conductors are connected to an impedance matching network at both said control station and said remote dispensing station.

7. The structure of claim 1 including a plurality of pump means at said dispensing station, and a pump selector switch at said control station to permit fluid to be dispensed from a selected pump.

8. The structure of claim 1 including a preset countdown counter for initially setting the amount of fluid to be dispensed and for automatically disabling said high-voltage power means when said preset amount is reached.

9. The structure of claim 1 including printing means for permanently recording the amount of fluid dispensed by said pump means.